Aug. 27, 1963     E. H. REPLOGLE ETAL     3,101,734
SOURCE SELECTING PRESSURE REGULATOR
Filed July 25, 1960
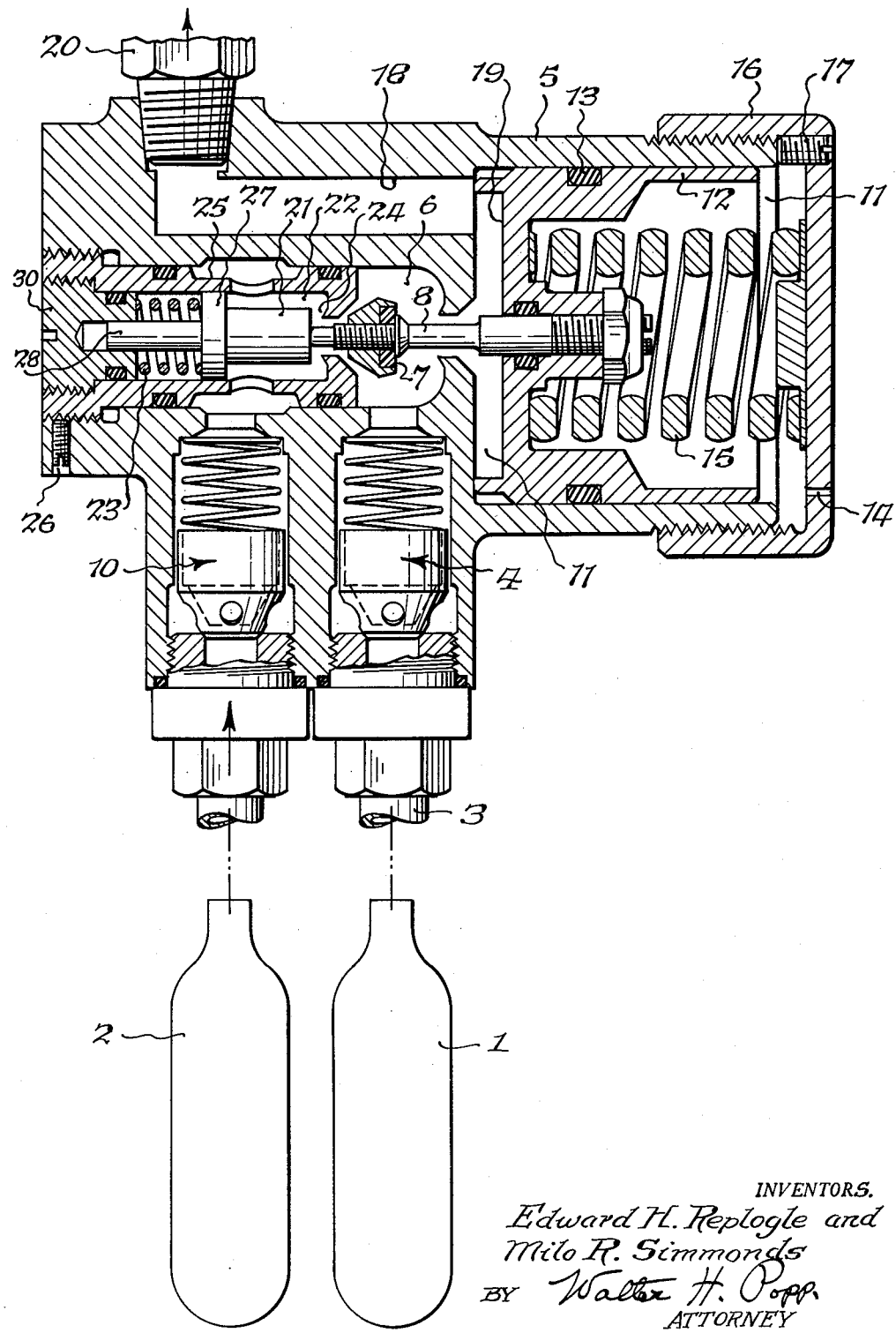
INVENTORS.
Edward H. Replogle and
Milo R. Simmonds
BY Walter H. Popp.
ATTORNEY 3,101,734
SOURCE SELECTING PRESSURE REGULATOR
Edward H. Replogle, Buffalo, and Milo R. Simmonds, Williamsville, N.Y., assignors of one-half to Scott Aviation Corporation, Lancaster, N.Y., and one-half to said Replogle
Filed July 25, 1960, Ser. No. 45,020
2 Claims. (Cl. 137—114)

This invention relates to a pressure regulator which is adapted to both regulate the pressure which is supplied by two different sources of fluid under pressure, and, in addition, to determine which of the two fluid sources is to supply the required fluid under whatever particular conditions happen to be present at any particular time.

The principal object of the invention is to supply fluid under suitable pressure from two different sources of fluid under relatively high pressure, but to favor that particular fluid source whose pressure is most essential to the performance of the mission to be accomplished. Another object of the invention is to effect the foregoing result and, at the same time, to individually control the pressure flowing from each of the fluid sources.

Other objects of the invention and practical solutions thereof are described in the herein specification and illustrated in preferred form in the accompanying drawing, wherein the sole FIGURE of said drawing is a partially schematic, vertical, longitudinal section through a source-selecting pressure regulator constructed in accordance with our invention.

For convenience, the herein invention will be described exactly as it is illustrated, but it is to be understood that the breadth of the invention is to be measured solely by its inherent novelty and by the scope of the appended claims.

Also, for convenience, we will assume that the present invention is employed to feed compressed air, under controlled pressure, to an ejectable capsule (not shown) of an airplane (not shown) both up to the time said capsule is ejected from the airplane and after it is ejected. We will also assume that the airplane has a large tank of compressed air which we shall term a primary fluid source 1, and a small tank of compressed air situated in the capsule, which latter tank we shall term a secondary fluid source 2. We will also assume that all of the apparatus shown in the accompanying drawing is located in the capsule except the primary fluid source 1 which latter is tubularly connected to the rest of the apparatus by an automatically disengageable "quick-connect."

It is obvious that the amount of compressed air in the secondary fluid source 2 should be conserved just as much as possible up to the time of the ejection of the capsule, so that at the time of ejection said secondary fluid source 2 will contain as much air as possible when the capsule is ejected. At the same time, it is desirable, under various operating conditions, to ensure that the capsule is provided with sufficient air at sufficient pressure from said secondary fluid source 2 whenever, temporarily, the pressure in the primary fluid source 1 drops too low. This desirable feature, of course, only obtains so long as the capsule is a part of the airplane and has not as yet been ejected.

The primary fluid source 1 is connected to a tube 3 which is tubularly connected by a releasable quick connect (not shown) to the lower end of a check valve 4. The main function of this check valve is to prevent the escape of air from the casing 5 of the pressure regulator, whenever the primary fluid source 1 is being replaced or repaired, or when the line 3 is automatically disconnected from source 1, as occurs when the capsule is ejected.

Compressed air flows up through said check valve 4 into a primary control chamber 6 in which is located a primary regulating valve 7 of the upstream type. The latter is rigidly secured to a piston rod 8. Compressed air in the primary control chamber 6 is prevented from flowing backwardly into the secondary fluid source 2 because the pressure in the latter is always as high or higher than the pressure in the primary fluid source 1. Such a backflow is also prevented by a secondary check valve 10, though the latter is not essential to the operation of the present invention.

The drawing illustrates the present invention in the position it assumes when there is no pressure in any of the lines or in either of the fluid sources 1 or 2. However, when there is sufficient pressure in the primary fluid source 1, the primary regulating valve 7 is closed for the following reason:

Formed in the main regulator casing 5 is a cylindrical, balancing chamber 11 in which is slidably arranged a movable partition in the form of a piston 12 having an external O ring 13 and rigidly, but adjustably, secured to aforesaid piston rod 8. The outer end of said balancing chamber 11 is open to the ambient atmosphere through an ambient aperture 14. A heavy compression spring 15 resiliently urges the piston 12 inwardly, and the compressive strength of this heavy spring 15 is adjusted by screwing in or out the threaded cover 16, after which adjustment said cover is locked in place by a set screw 17. (It is obvious that this arrangement could be replaced by an ordinary aneroid.)

Pressure from the primary fluid source 1 presses against the inner face 19 of the piston 12 so long as the primary regulating valve 7 is open, and enables said piston to move outwardly until said primary regulating valve 7 closes. The latter now acts as an ordinary pressure regulating valve to feed compressed air, at a substantially uniform pressure, out through duct 18 to the outlet 20 of the pressure regulator.

While the foregoing pressure regulation has been going on, the piston rod 8 has been pushed outwardly and out of contact with the secondary regulating valve 21 which latter is located in a secondary control chamber 22. The latter receives its compressed air from the secondary fluid source 2, but no air flows out from said secondary control chamber, so long as its regulating valve 21 is out of contact with piston rod 8 and is being pushed to its closed position by its light compression spring 23.

With this secondary regulating valve 21 in its closed position, let us now assume that operating conditions in the airplane are such that temporarily, the pressure in the primary control chamber 6 has dropped so low that the heavy compression spring 17 is able to hold open the primary regulating valve 7. As the pressure in said primary control chamber continues to drop, the piston rod 8 is pushed sufficiently far to the left to open the secondary regulating valve 21, and the job of supplying compressed air is then transferred, temporarily, to the secondary fluid source 2.

This continues until the pressure in the primary fluid source 1, and in the balancing chamber 11, rises sufficiently to withdraw piston rod 8 from contact with the secondary regulating valve 21. The primary fluid source 1 then takes over the job of supplying the required compressed air.

Just at what pressure the secondary fluid source retires to the sidelines depends on the longitudinal position of the valve seat 24. Adjustment of the longitudinal position of this valve seat 24 is effected by having it formed as an integral part of a secondary valve casing in the form of a tubular adjustment sleeve 25 whose outer end is threaded into the main casing 5, so as to be longitudinally screwed in or out, and the adjustment then locked in place by a set screw 26. The cylindrical bore of the adjustment sleeve 25 acts as a guide for the collar 27 of the secondary regulating valve 21. The stem 28 of said valve is suitably guided in the screw plug 30 which is screwed into the outer end of the adjustment sleeve 25.

We claim:

1. A pressure operated automatic selector valve comprising a casing having an elongated passage therein, one end of said passage being enlarged and comprising a balancing chamber, a movable partition mounted within said balancing chamber and dividing it into inner and outer portions sealed from one another by said movable partition, first spring means within said outer portion connected to said movable partition and urging it axially inwardly, the other end of said passage being separated from said one end by a transverse wall having a central passage therethrough comprising a primary valve seat, a valve stem secured to said movable partition and projecting axially through the central passage in said primary valve seat in spaced relation thereto, a hollow secondary valve casing extending into the other end of said first mentioned passage and adjustably connected thereto for axial adjustment relative to said first mentioned casing, the inner end of said hollow secondary valve casing comprising a secondary valve seat having a port therethrough and receiving therethrough the free end of said valve stem in spaced relation, a secondary valve member axially movable within said secondary casing, secondary valve spring means within said secondary valve casing urging said secondary valve member toward said secondary valve seat so as to close the port therethrough, the space between the inner end of said secondary valve casing and said primary seat comprising a primary valve control chamber and the space between the secondary valve member and the end of said secondary valve casing comprising a secondary control chamber connected to said primary control chamber by means of said port, a primary valve member secured on said stem within said primary chamber, separate primary and secondary conduits extending generally radially through said first mentioned casing and communicating with said primary control chamber and said secondary control chamber respectively, said primary and secondary conduits adapted to be connected to primary and secondary sources of pressure respectively, a check valve within said primary conduit preventing fluid flow from said primary control chamber, said first mentioned casing being formed with an exhaust passage having one end in communication with the outer periphery of the axially inner portion of said balancing chamber and the other end thereof extending through the outer surface of said first mentioned casing, said first spring means normally urging said movable partition axially inwardly whereby said valve stem moves both said primary and secondary valve members from their respective valve seats so that both said secondary and primary conduits are in communication with said balancing chamber and exhaust passage, said primary valve member normally being spaced axially a greater distance from its valve seat than said secondary valve member is spaced from its valve seat whereby when a predetermined pressure is admitted to said balancing chamber from said primary conduit, said movable partition will move outwardly to compress said first spring means a predetermined distance so as to close said port by the secondary control valve member and permit said primary control valve member to remain spaced from said primary valve seat, said first spring means moving said movable partition and valve stem axially inwardly when the pressure in said balancing chamber drops below said predetermined pressure whereby said valve stem contacts said second valve member and moves it axially away from said port.

2. The combination defined in claim 1, wherein the outer end of said secondary valve casing has an adjustable abutment threaded therein contacting the spring means within said secondary valve casing.

References Cited in the file of this patent

UNITED STATES PATENTS

| | | |
|---|---|---|
| 1,480,909 | Johnson | Jan. 15, 1924 |
| 2,365,423 | MacSporran | Dec. 19, 1944 |
| 2,737,202 | Baldwin et al. | Mar. 6, 1956 |
| 2,887,123 | Becker | May 19, 1959 |
| 2,894,526 | Booth et al. | July 14, 1959 |
| 2,904,068 | St. Clair | Sept. 15, 1959 |

FOREIGN PATENTS

| | | |
|---|---|---|
| 664,717 | Germany | Sept. 5, 1938 |